CONTINUOUS PLANE SUPERCONDUCTIVE MEMORY WITH REGIONS OF LOWERED CRITICAL FIELD

Filed Nov. 30, 1966

INVENTOR.
Claudio Dalmasso
BY George V Eltgroth and Joseph B Forman 3,522,591

CONTINUOUS PLANE SUPERCONDUCTIVE MEMORY WITH REGIONS OF LOWERED CRITICAL FIELD

Claudio Dalmasso, Ivrea, Turin, Italy, assignor to Olivetti-General Electric S.p.A., Caluso, Turin, Italy, a corporation of Italy Filed Nov. 30, 1966, Ser. No. 598,005
Claims priority, application Italy, Dec. 1, 1965, 11,781/65
Int. Cl. H03k *3/38*; G11c *11/44*
U.S. Cl. 340—173.1 4 Claims

ABSTRACT OF THE DISCLOSURE

A cryogenic memory element whose operation is characterized by the selective induction of superconductive currents around twin regions of reduced critical field in a plane of homogeneous superconductive material. The regions of lowered critical field are located below and defined by two discrete regions of nonsuperconductive material deposited on one surface of the plane. The superconductive currents circulating around the regions of reduced critical field support a magnetic field which links the two regions and has a flux attitude indicative of stored binary information.

BACKGROUND OF THE INVENTION

Figure 1:
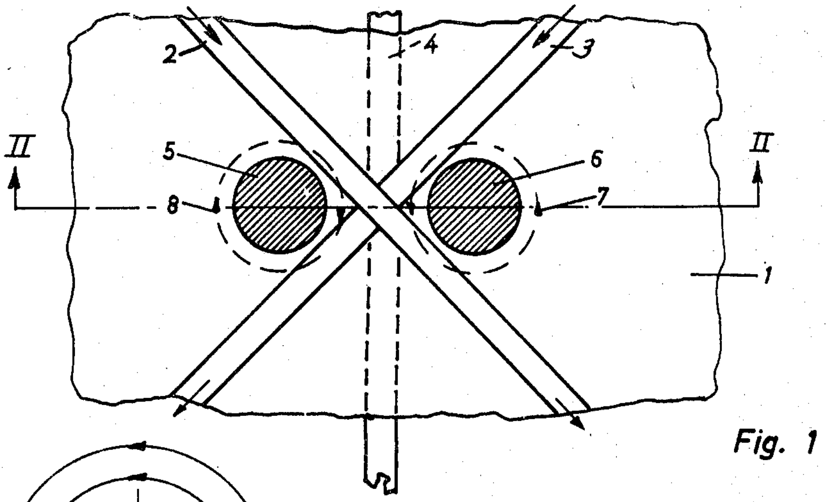

This invention relates to superconductive information storage devices and, more particularly, to cryogenic memory devices whose operation is characterized by circulating superconductive currents.

In the prior art Crowe cell memory, every memory bit location is composed of a pair of holes, divided by a strip, which have been cut out of a plane of superconductive material having a convenient critical field. Either binary value of an information element, or bit, conventionally named ONE or ZERO, is registered in the memory location, depending upon the direction in which superconductive currents flow around the holes. To read the recorded information, and to write the same, the material of the strip between the holes is selectively rendered resistive by the field set up read or write currents, thereby cutting off said superconductive currents. Thereafter, currents of opposite sense are caused to flow around the holes. One of the inconveniences of this prior art device is the fact that the planar regions which lie at the edges of the holes have a poorly defined critical field, which in many cases, is substantially higher than the one normally associated with the superconductive material comprising the plane.

Due to this irregular condition, switching the material located at these edges from the superconducting to the resistive state (and vice versa), does not take place in a uniform manner for every memory bit location in the plane and substantial differences may exist between different memory planes.

Another prior art device, frequently referred to as a Continuous Plane Memory, is substantially similar to the one just described, except that holes are not made in the superconductive plane. In their place, there are "islands" of material which have become resistive by the action of the magnetic field set up by the read and write currents. These islands become superconductive and then resistive each time that the value of the registered bit changes from ONE to ZERO or vice versa in the process of reading or writing. During the reading or writing process such islands disappear and are reformed immediately thereafter. The system requires a continuous expenditure of energy for switching the island material to and from the resistive state. Furthermore, there is considerable uncertainty relating to the position, the form, and the characteristics of the newly formed islands.

Such devices have been described, for instance, in the article "Coincident Current Superconductive Memory" by L. L. Burns et al., at page 421 et seq. of the book, edited by M. C. Yovitts, "Large Capacity Memory Techniques for Computing Systems," published by Macmillan, London and New York, 1963.

The satisfactory operation of such memory devices is critically limited by the difficulty of producing planes which respond in a uniform and reproducible way to the desired switching specifications.

It must be kept in mind that one of the most advantageous features of superconductive storage device is that a high density of memory elements may be attained. Storage devices with very high memory capacity are realizeable where it is possible to eliminate the relatively great differences in operating characteristics between individual memory elements.

Accordingly, the principal object of the present invention is to increase the operating uniformity of the memory bit locations in a continuous plane storage device, in order to allow a substantial increase in the overall capacity of said devices.

SUMMARY OF THE INVENTION

This principal object is attained, according to one embodiment of the invention, by depositing, on selected portions of a continuous plane of superconducting material, limited regions of a material not subject to the superconductive effect, thereby causing, in the portions of the plane underlying said regions, a substantial lowering of the critical switching field of said superconductive material and thereby making it posible to obtain a precise and permanent localization of the resistive islands.

By thus lowering the critical field, the amount of energy required for switching said islands into and out of the resistive state is substantially decreased.

The invention has the advantage over Crowe cells that, in absence of the holes, there are no detrimental edge effects which cause malfunctions in the switching operation.

DESCRIPTION OF THE PREFERRED EMBODIMENTS

These and other features of the invention will become apparent from the following description of a preferred embodiment thereof, taken in conjunction with the accompanying drawings, in which:

FIG. 1 represents a memory element formed according to the invention.

FIGS. 2A to 2D schematically represent the paths of the fluxes and the state of the material in different phases of operation, in a sectional view of the device along line II of FIG. 1.

Figure 3:
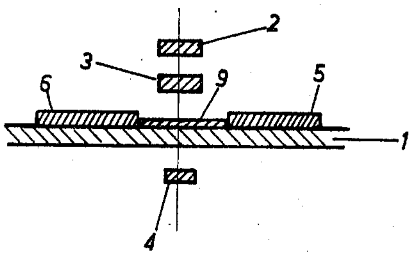

FIG. 3 represents a modified form of the invention.

With reference to FIG. 1, representing a memory bit location of a continuous plane memory device according to the invention, two conductors, 2 and 3, which cross one another at substantially right angles, are deposited over the plane 1 of superconducting material. These conductors constitute a crosspoint of a memory matrix, which comprises a first set of conductors passing through all the crossing points of the two sets of conductors. Conductors 2 and 3 are the read and write conductors, which carry the current pulses controlling the operation of the device, and the conductor 4 is the sense conductor, carrying the output signals.

The continuous plane 1 is made of a superconductive material, such as lead, having a relatively low critical field, that is, a material which may become resistive when submitted to a magnetic field of relatively low value. Conductors 2, 3, and 4 are made of a material of relatively high critical field, that is, of a material which will remain in the superconductive state during the operation of the device.

Conductors 2, 3, and 4 are reciprocally insulated from one another and from the plane by means of thin layers of insulating material, such as silicon dioxide, interposed therebetween. The device is maintained at a conveniently low temperature by known means, such as a bath of liquid helium.

Two substantially circular regions of a material which is not subject to superconductive effects, such as gold, are deposited in a layer of convenient thickness and located symmetrically with respect to the two right angles defined by conductors 2 and 3. The remaining set of opposing right angles are bisected by conductor 4 which passes beneath the plane.

It is known that the deposition of a film of nonsuperconducting material directly on a superconducting material causes a substantial lowering of the critical field associated with the superconducting material. Accordingly, the portions of said plane which immediately underlie the deposited regions become resistive when submitted to a magnetic field lower than the one necessary to render resistive the remaining portions of the continuous plane. This effect is described, for example, in the article by P. H. Smiths et al. "Superconducting Characteristics of Superimposed Metal Films" published in Physical Review Letters, vol. 6, No. 12 at page 686 (1961).

The general operation of the described memory device does not differ from the known operation of prior art continuous plane superconductive storage devices. However, for clarity, this operation is briefly recalled hereinafter. To write an information unit, for example a logical ONE, two currents of proper intensity are fed into the conductors 2 and 3 (FIG. 1) in the directions shown by the arrows. The magnetic field caused by such currents follows approximately the path shown in FIG. 2A with such intensity, as to cause the switching of all the material in the area immediately underlying the crossing of said conductors, as well as the material underlying the deposited regions.

In FIGS. 2A to 2D and in FIG. 3 the parts of the continuous plane which remain superconductive are shown by the hatched sections, while the parts which become resistive are in white.

When the write currents cease, all portions of the plane having a higher critical field return to superconductivity, thus allowing for the circulation of two superconductive currents around the islands which underlie the regions 5 and 6. These superconductive currents, whose paths are approximately indicated by the dashed lines 7 and 8 in FIG. 1, are induced by the variation of the magnetic field due to the cessation of the write currents.

Figure 2:
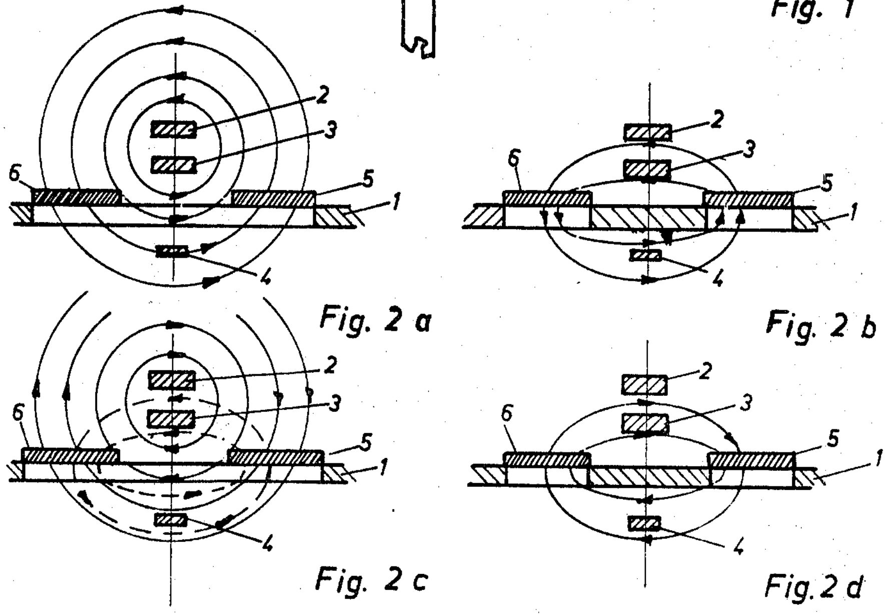

These superconductive currents set up a magnetic field, whose path is indicated in FIG. 2B, and which maintains the islands in the resistive state. This effect is facilitated, according to the invention, by the fact that the material underlying the regions 5 and 6 has a critical field lower than the remainder of the plane. As a consequence, the resistive islands will coincide exactly with the portions of the continuous plane underlying said regions. Such conditions are maintained indefinitely, without loss of energy, therefore storing an information unit, for instance a binary ONE.

To read the information thus stored, read currents having an intensity approximately equal to, and a direction opposite to, the former write currents are sent along the read and write conductors 2 and 3. The field generated by these read currents is superimposed of the preexisting field as shown in FIG. 2C, wherein the path of the flux of the pre-existing field is shown by the dashed lines, and the path of the flux set up by the read currents is shown by the solid lines. The resulting field in the portion of the plane directly underlying the crossing will be higher than that portion's critical field, and said portion of the plane will become resistive. This causes the extinction of the superconducting currents flowing around the islands, and the cessation of the field set up by said currents. Therefore the islands become subject only to the field set up by the read currents, which, in relation to the islands, has a direction opposite to that of the pre-existing field. During the change of direction, the intensity of the field will pass through a null and therefore the islands will become superconductive for a short interval of time. Immediately afterward, as the field reaches the critical value, the island returns to resistivity. According to the invention, these new resistive islands will be formed exactly and exclusively in those portions of the continuous plane which underlie the deposited regions, while in the absence of said deposited regions the new islands may differ substantially in form and position from the former one. By virtue of the lowered critical field, the energy required to form the new resistive islands is lower than in the prior art.

The field set up by the read current, having rendered resistive the portion of the plane underlying the crossing of the conductors, penetrates through the plane and links itself with the sense conductor 4, providing an output signal.

When the read currents cease, the portion of the plane underlying the crossing returns to a superconductive state, and superconductive currents circulate around the closed lines 7 and 8 of FIG. 1, but in opposite directions. The field set up by them, which maintains the islands in the resistive state, is opposite to the one of FIG. 2B. This condition is shown in FIG. 2D and corresponds to the registering of a logical ZERO.

The operation of the memory in all other cases, when the material in the islands or on other regions of the plane does not switch from the resistive to the superconductive state, or vice versa, is identical to the operation of the known continuous plane memory, and are fully described in the literature cited.

It may be noted also that the portion of the plane directly underlying the crossing of the conductors 2 and 3 is alternatively switched from one to the other state. Therefore, according to a modification of the invention, it may be convenient to lower the critical field in said portion to a proper value. This value must be lower than the critical field of the rest of the plane, but higher than the critical field of the islands; since, during the diminution of the field due to the cessation of the read and write currents, said portion must resume its superconductive state for a value of field higher than one at which the islands may become superconductive, in order to allow the circulation of the superconductive currents which maintain the islands resistive.

This intermediate value of critical field may be obtained by depositing on the portion of the plane underlying the crossing of the conductors, a layer of nonsuperconductive material, such as gold, a thickness smaller than the one of the layers deposited in the regions 5 and 6. This deposition is schematically represented in FIG. 3.

A typical value of the thickness of the layer of the nonsuperconducting material such as gold, to be deposited in correspondence of regions 5 and 6 is 2000–3000 angstroms.

In the embodiment of the invention shown in FIG. 3 the layer deposited in the region underlying the crossing of the conductors may have a thickness of approximately 500 angstroms.

What I claim is:

1. A superconductive memory element, comprising, in combination:

a portion of a plane of superconductive materials, read, write and sense conductors of such material as to remain permanently superconductive at the operating temperature of the memory, insulating layers interposed therebetween, limited regions of a layer of a nonsuperconductive material contacting said plane in order to cause the lowering of the critical field of the material constituting said plane in the portions underlying said regions.

2. A superconductive memory element, comprising, in combination:

a portion of a plane of superconductive material, read and write conductors deposited on one side of said plane, crossing themselves at a substantially right angle, and a sense conductor deposited on the other side of said plane, substantially along the bisecting line of a pair of said right angles, said conductors remaining permanently superconductive at the operating temperature of the memory, insulating layers reciprocally separating and electrically insulating said conductors and said plane, at least two limited regions of a deposited layer of nonsuperconducting material, located in proximity of the crossing point of said conductors, at opposite sides in respect to all three said conductors, contacting said plane in order to cause the lowering of the critical field of the material constituting the plane and consequently the formation, under the effect of the magnetical fields set up by the currents flowing into said conductors, of resistive islands in the portions of said plane contacting said regions.

3. A superconductive memory element, as claimed in claim 1, wherein also the portion of the plane comprised between said portions contacting said limited regions, and extending through the crossing point of said conductors, is contacting a layer of nonsuperconductive material, of a thickness substantially smaller than the thickness of the layer of nonsuperconducting material in said limited regions.

4. A superconductive memory element, as claimed in claim 2 and wherein the portion of the plane defined between said portions contacting said limited regions, and extending through the crossing point of said conductors, contacts a layer of nonsuperconductive material, of a thickness substantially smaller than the thickness of the layer of nonsuperconducting material in said limited regions.

References Cited

UNITED STATES PATENTS 3,275,930 9/1966 Cassidy ----------- 340—173.1

TERRELL W. FEARS, Primary Examiner

U.S. Cl. X.R.

307—306